United States Patent [19]

Casstevens

[11] Patent Number: 4,563,114
[45] Date of Patent: Jan. 7, 1986

[54] METHOD FOR MACHINING STEEL WITH DIAMOND TOOLS

[75] Inventor: John M. Casstevens, Greenville, Tex.

[73] Assignee: The United States of America as represented by the Department of Energy, Washington, D.C.

[21] Appl. No.: 488,301

[22] Filed: Apr. 25, 1983

[51] Int. Cl.$^4$ .......................... B23C 5/28; B24B 55/02
[52] U.S. Cl. ..................................... 409/131; 51/266; 51/308; 82/1 C; 408/1 R
[58] Field of Search ................. 409/131, 132; 82/1 C; 407/119; 408/1 R, 145; 51/308, 266, 267

[56] References Cited

U.S. PATENT DOCUMENTS

| | | | |
|---|---|---|---|
| 2,259,468 | 10/1941 | Houchins | 51/308 |
| 3,152,426 | 10/1964 | Arneson | 51/267 |
| 3,816,085 | 6/1974 | Hall | 51/308 X |
| 4,437,800 | 3/1984 | Araki et al. | 407/118 X |

FOREIGN PATENT DOCUMENTS

| | | | |
|---|---|---|---|
| 1546590 | 5/1979 | United Kingdom | 51/266 |
| 1550430 | 8/1979 | United Kingdom | 51/266 |

*Primary Examiner*—Z. R. Bilinsky
*Attorney, Agent, or Firm*—Earl L. Larcher; Stephen D. Hamel; Judson R. Hightower

[57] ABSTRACT

The present invention is directed to a method for machining optical quality finishes and contour accuracies of workpieces of carbon-containing metals such as steel with diamond tooling. The wear rate of the diamond tooling is significantly reduced by saturating the atmosphere at the interface of the workpiece and the diamond tool with a gaseous hydrocarbon during the machining operation. The presence of the gaseous hydrocarbon effectively eliminates the deterioration of the diamond tool by inhibiting or preventing the conversion of the diamond carbon to graphite carbon at the point of contact between the cutting tool and the workpiece.

3 Claims, No Drawings

METHOD FOR MACHINING STEEL WITH DIAMOND TOOLS

BACKGROUND OF THE INVENTION

The present invention relates generally to the machining of steels with diamond tools, and more particularly, to a method of substantially reducing the wear rate of diamond tools during the machining of steel workpieces. The present invention was made as a result of work under Contract W-7405-ENG-26 with the United States Department of Energy.

Diamond machine tools have been used with success for providing soft materials such as copper or ceramics with optical quality surface finishes with highly accurate contours. The use of the diamond tools for machining such metals with such surface finishes is that relatively ductile metals such as copper and some brittle ceramic materials possess low chemical activity with carbon, low yield strengths, low toughness, and chips are formed on these materials with a relatively low energy input due to the ductility of the copper and brittle fracture mechanism of ceramics. Efforts to provide workpieces of steel or similarly hard alloys with optical quality surfaces and accurate dimensions by using diamond cutting tools have not proven to be successful because the wear rate of the diamond cutting tools is extremely excessive. In fact, it has been reported that the wear rate for diamond cutting tools used for machining hardened steel is about 10,000 times greater than that for similar diamond tools used for machining brass. The wear rate of diamond tooling for machining optical quality surfaces on hardened steel is such that only a surface area of less than about 0.3 square inch can be finished with the tool before the tool needs to be replaced. Steel is characterized by possessing toughness, strength, chemical reactivity with carbon.

Efforts to determine the cause or causes for the wear rate of diamond tools and to overcome this problem so that machining of steel and other hard metals can be achieved with diamond tooling in order to provide desired optical quality surface finishes have not proven to be successful. Using expert machining practices with precision equipment did not lessen the wear rate of the diamond tooling to an acceptable level. Investigations indicated that the excessive wear rate on the diamond cutting tool when machining hardened steel was not caused by overheating, abrasion, or mechanical failure by microclevage which are usually the mechanisms responsible for the failure of conventional cutting tools. It appears that the failure of the diamond cutting tool is due to the conversion of the surface layer of the diamond tool in contact with the steel from the diamond form of carbon to a graphite carbon form with the constituents in the steel such as iron or nickel acting as a catalyst for this conversion.

SUMMARY OF THE INVENTION

It is the primary aim or objective of the present invention to provide a method for significantly decreasing the wear rate of diamond tools utilized for cutting metals such as hardened steels whereby articles of such metals may be machined economically with optical quality surfaces and accurate dimensions. The method of the present invention is practiced by machining a steel workpiece with a diamond cutting tool by subjecting the interface between the cutting tool and the workpiece with a saturated hydrocarbon atmosphere during the machining operation. The atmosphere of saturated hydrocarbon at the interface together with the attendent pressure and temperature encountered during machining create a diamond synthesizing environment at the point of contact between the diamond cutting tool and the workpiece to inhibit the conversion of diamond carbon to graphite carbon so as to significantly decrease the wear rate of the diamond cutting tool.

Other and further objects of the invention will be obvious upon an understanding of the illustrative method about to be described or will be indicated in the appended claims, and various advantages not referred to herein will occur to one skilled in the art upon employment of the invention in practice.

DETAILED DESCRIPTION OF THE INVENTION

As briefly described above, the present invention is directed to a method for machining hard metals such as hardened steels with diamond tooling in such a manner that the wear rate of the diamond tools is significantly reduced. By employing the method of the present invention, optical quality finishes and accurate contour cutting may be accomplished on steels by using diamond cutting tools without encountering the deleterious deterioration of the diamond tool as previously encountered during the machining of steel. The wear rate and rapid deterioration of the diamond cutting tools when machining steel is due to the presence of the heat and pressure at the interface between the tip of the cutting tool and the workpiece whereby the contacting surface layer of the diamond carbon forming the tool is converted to graphite carbon which deteriorates very rapidly during a machining operation. Nickel and iron in the workpiece enhances this conversion of diamond to graphite by acting as a catalyst. This conversion of the diamond to graphite is so deleterious to the diamond cutting surface that the cutting tool can be used for obtaining optical quality machine surfaces of only less than about 0.3 square inch before the tool becomes deteriorated to such an extent as to require replacement.

The method of the present invention obviates or significantly reduces the wear rate of diamond tooling due to this conversion of the diamond to graphite by contacting or saturating the environment or atmosphere surrounding the interface between the cutting tool and the workpiece with a hydrocarbon gas. It is believed that this atmosphere of hydrocarbon gas prevents the conversion of the diamond to graphite by creating a diamond synthesizing environment at the interface due to the presence of the carbon in the hydrocarbon gas and the heat and pressure encountered during the machining operation. The presence of the hydrocarbon atmosphere at the interface inhibits the conversion of the diamond to graphite so as to allow the machine tool to have a significantly longer work life whereby a considerable area of the workpiece may be machined prior to replacement of the diamond cutting tool due to normal abrasion or microcleving such as occurs with conventional cutting tools.

Methane was used to provide the saturated hydrocarbon atmosphere at the interface between the cutting tool and the workpiece. However, it is expected that other hydrocarbon gases such as in the alkane, alkene, and alkyne series or a combination of such gases may be used with satisfactory results. The quantity of hydrocaron gas at the interface is such that the concentration is adequate or sufficient to inhibit the conversion of the diamond carbon to graphite carbon.

In practicing the present invention, the workpiece and cutting tool as well as the attendant structures, may be confined in a suitable housing. The hydrocarbon gas may then be introduced into this housing to provide a positive pressure therein so as to inhibit the influx of oxygen which could create an explosive atmosphere.

In practicing the method of the present invention, the diamond tool and workpiece were enclosed in the gas impervious flexible bag of polyvinyl chloride. Methane was introduced into the bag at a rate sufficient to maintain a pressure of approximately 2 psi above atmosphere pressure so as to inhibit the introduction of oxygen into the enclosure defined by the polyvinyl bag. Gases from the enclosure may be vented to a suitable fume extractor. Flat discs of mild steel (AISI 1018) the hardness of 223 BHN, a high carbon steel disc (AISI 1090) with a hardness of 578 BHN, and a disc of annealed high carbon steel the hardness of 170 BHN were machined in the methane-saturated atmosphere within the polyvinyl bag. The discs were each cleaned in a normal manner prior to machining. A commercially available cutting fluid such as modified mineral oil was used for the machining operation. In using conventional machining practices, the steel discs were machined with optical quality surfaces and examined after machining. Data for the machined discs indicated optical quality surfaces with peak-to-valley roughnesses of less than 12.5 nanometers (nm) which is comparable to that achieved when diamond machining soft metals such as aluminum and copper. An examination of the diamond tool with a microscope at a magnification factor of 455x and with a scanning electron microscope indicated that the diamond tool suffered only very slight deterioration or visible edge defects after machining an area of approximately 3 square inches in the methane environment for each of the steel discs.

In comparison, discs of the same metals were machined with a diamond tool in a normal air environment and suffered such rapid deterioration as to require replacement after machining an area of only approximately 0.3 square inch.

It will be seen that the present invention provides a relatively simple yet highly effective method for overcoming a significant problem encountered in the machining art which now permits optical quality surfaces on hard metals such is steels to be readily achieved with diamond cutting tools. By practicing this method, the wear rate of the diamond tool is effectively elminated so that the machining operation of optical quality surfaces may be achieved without replacement of the diamond tool at the frequency previously required.

What is claimed is:

1. In the art of machining a steel workpiece with a diamond cutting tool, a method for decreasing the wear rate of the cutting tool, comprising the step of providing a gaseous hydrocarbon atmosphere at the interface between the cutting tool and the workpiece during the machining of the latter with the concentration of the gaseous hydrocarbon being adequate to inhibit the conversion of diamond carbon to graphite carbon at the point of contact of the diamond tool with the workpiece.

2. The method claimed in claim 1, including the steps of confining the cutting tool and the workpiece in an enclosed volume, and saturating the atmosphere in the enclosed volume with a gaseous hydrocarbon.

3. The method claimed in claim 1, wherein the gaseous hydrocarbon is methane.

* * * * *